United States Patent [19]
Blanding

[11] Patent Number: 5,801,336
[45] Date of Patent: Sep. 1, 1998

[54] AERIAL CONDUCTOR SPACER

[76] Inventor: Douglas Blanding, 1016 Smithridge Rd., Bridgeport, N.Y. 13030

[21] Appl. No.: 922,012

[22] Filed: Sep. 2, 1997

[51] Int. Cl.$^6$ ............................................... H02G 7/12
[52] U.S. Cl. ............................................... 174/146
[58] Field of Search ........................... 174/146, 41, 42, 174/43, 128.1, 128.2; 248/49, 61, 68.1, 74.1; 439/776

[56] References Cited

U.S. PATENT DOCUMENTS

| | | | |
|---|---|---|---|
| 3,121,770 | 2/1964 | Dallye | 174/42 |
| 3,268,655 | 8/1966 | Haigh et al. | 174/146 |
| 3,978,276 | 8/1976 | Pffenberger et al. | 174/42 |
| 5,371,320 | 12/1994 | Torok et al. | 174/42 |

*Primary Examiner*—Kristine L. Kincaid
*Assistant Examiner*—Joseph Waks
*Attorney, Agent, or Firm*—George R. McGuire

[57] ABSTRACT

A device for maintaining separation of the cables in a 3-phase, electric distribution system. The spacer device includes three body members each having first and second, rod receiving, bored holes formed therein. In two of the body members, the first and second holes extend along respective linear axes at about a 30° angle to one another, while in the third body member the holes are disposed at about a 120° angle. Elongated rods are removably positioned within the bored holes, thereby serving to interconnect the body members. Each spacer device further includes a cable clamping member pivotally and slidably attached to each body member. The clamping members are movable between engaged and disengaged relation to the body members, thereby retaining or releasing, respectively, the electric cables.

4 Claims, 6 Drawing Sheets

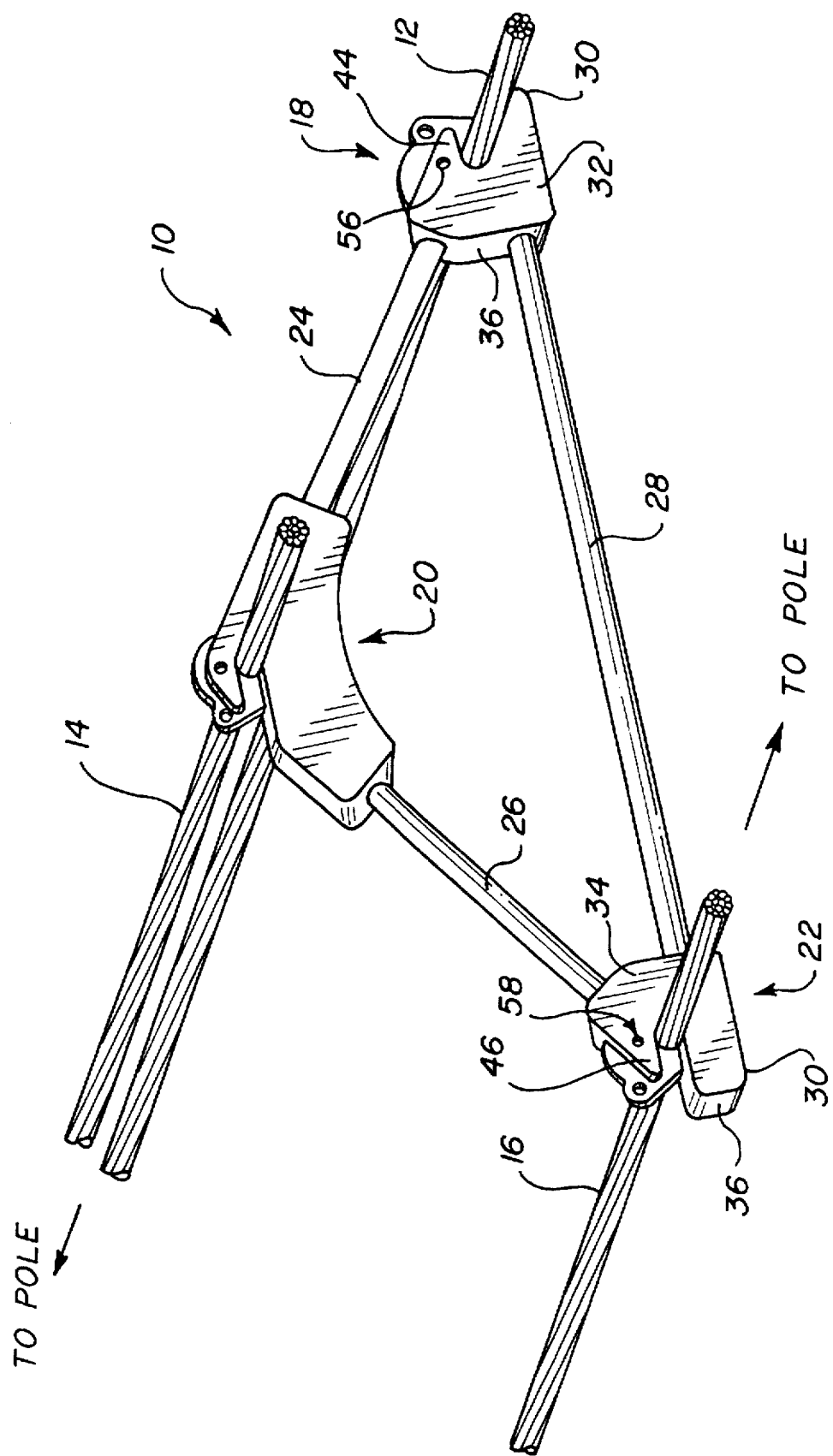

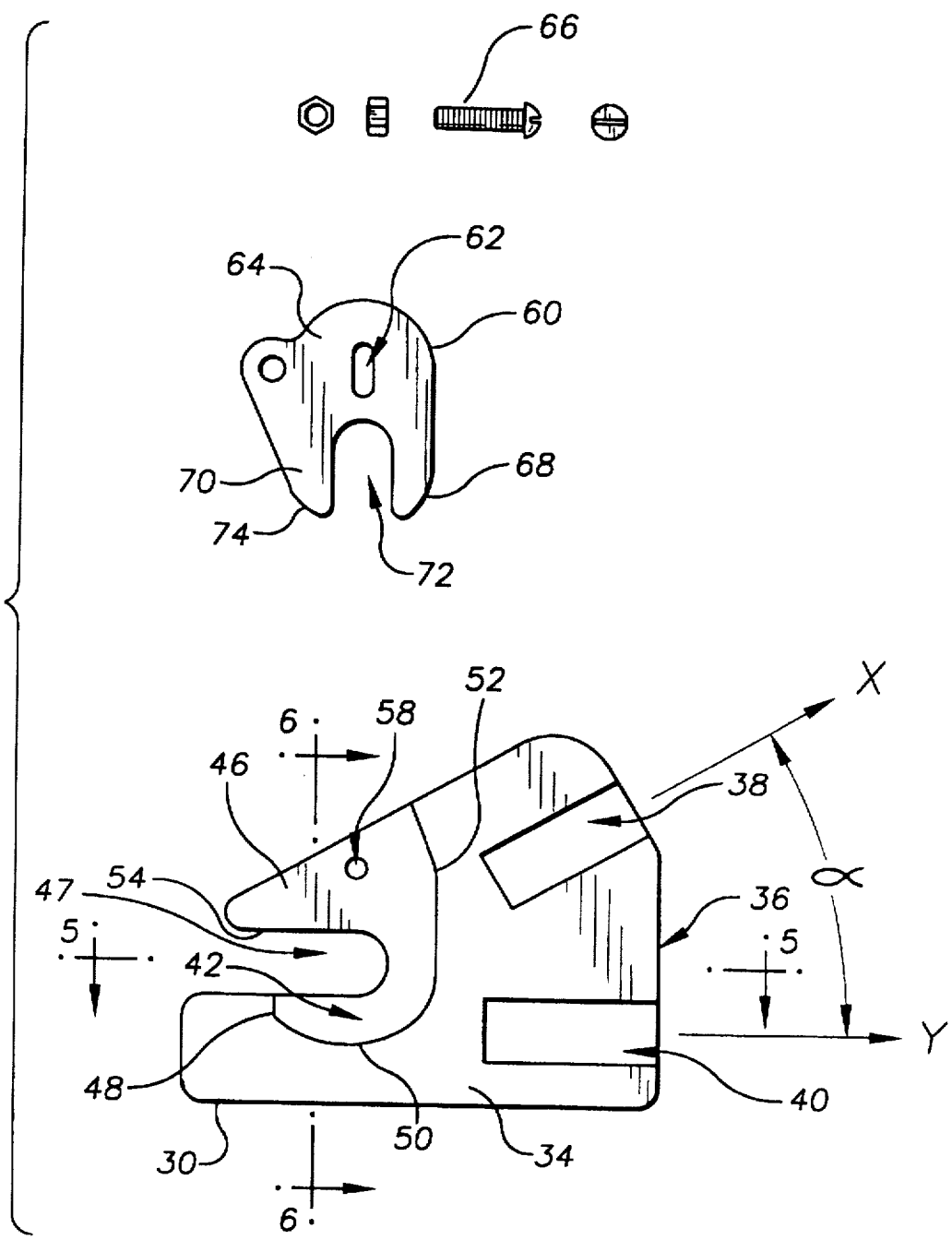

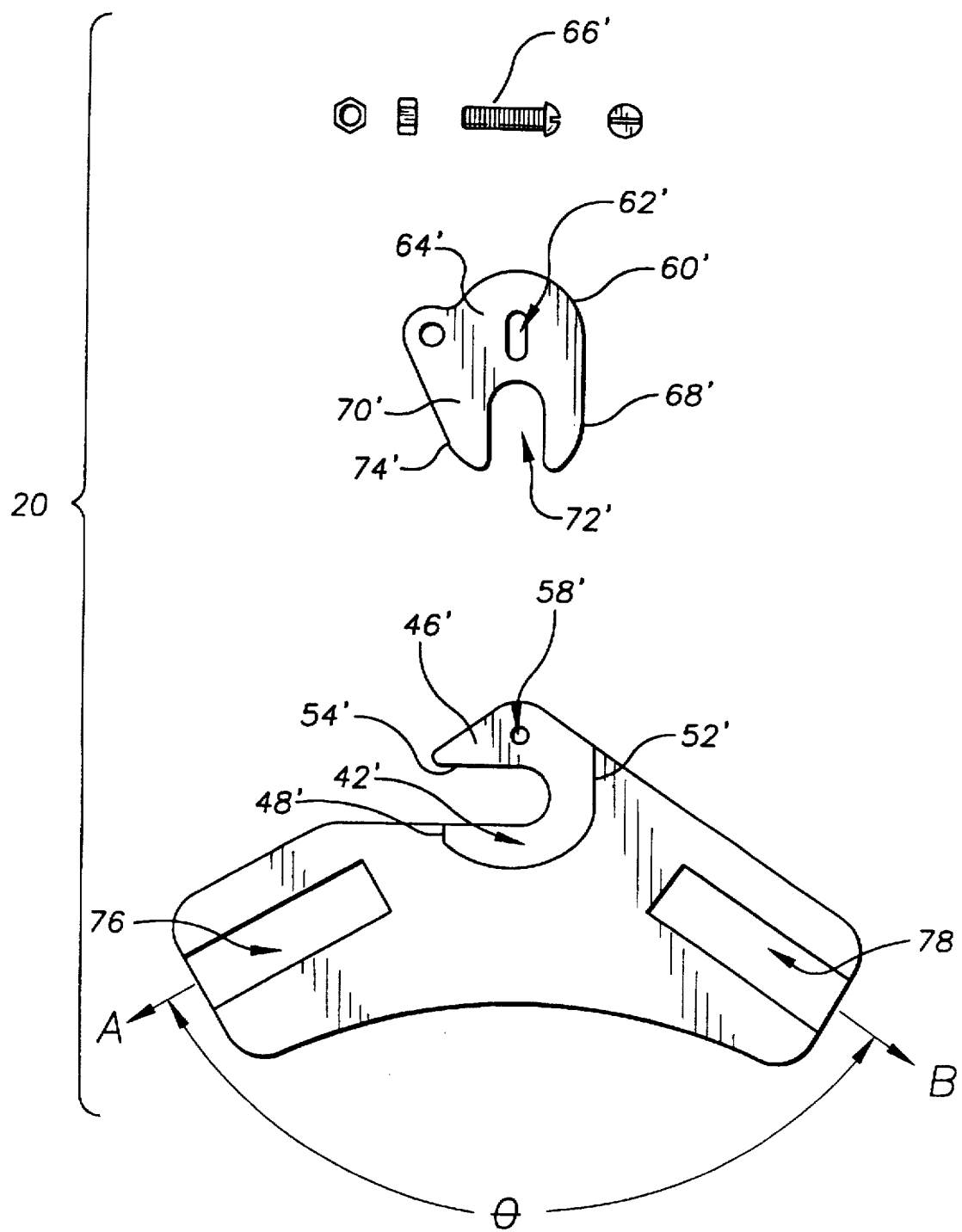

5,801,336

AERIAL CONDUCTOR SPACER

BACKGROUND OF THE INVENTION

The present invention generally relates to devices employed to maintain separation of suspended primary electrical conductors arranged in a 3-phase system, and more particularly to such spacer devices which are modular in nature and have improved means for maintaining the conductors in locked relation to the spacer devices.

A common overhead electric distribution system generally operates in one of two ways: either in an arrangement known as a "grounded wye system" or in a "delta system." In both systems, three primary conductors operate at voltages 120 degrees out of phase with one another (commonly referred to as a "3-phase system"), with the voltage traveling out from a source (typically a "sub-station") through the primary conductors, and then returning to the source. In the grounded wye system, the voltage returns to the source through a neutral (grounded) conductor; while in the delta system, the voltage returns through one of the three primary conductors.

When a conductor makes contact with a primary conductor of a different phase voltage, there is a difference in potential, thereby causing a fault (a fault being analogous to a short circuit which occurs when an energized wire comes into contact with a ground). Elements such as high winds, ice, falling tree limbs and distortion of utility pole sets cause conductors to come into contact with one another, thus creating faults in the system. Most electric distribution systems do take precautionary measures by employing over current protective devices such as sub-station breakers, sectionalizers and fused disconnects in order to prevent major damage to the system and minimize the effects of a potentially dangerous situation. Even with the aid of these devices, however, the system down time due to the fault is very costly to the utility company and very inconvenient for the people whose power is off until power is restored to the system.

To further prevent faults from occurring, devices which are placed on the conductors in order to maintain the spacing and separation of the conductors have been developed. Examples of such spacer devices can be readily seen in U.S. Pat. Nos. 3,254,151 to Myers; 3,939,300 to Hawkins; 3,925,525 to Hawkins, 5,371,320 to Torok et al.; 4,480,149 to Hawkins et al.; 3,055,623 to Becker; 3,456,066 to Petze; 4,020,277 to LaChance, Sr. et al.; 4,533,785 to Riganti; 2,831,915 to Prowant; 3,383,739 to Pitzel; and 5,021,612 to Joffe. Although the prior art spacer devices effectively separate cables, they are generally not versatile enough to be used on systems having lines spaced at different distances apart (e.g., one system requires three feet between cables, while another system requires four feet of separation).

It is a principal object and advantage of the present invention to provide a new and improved aerial cable spacer that may be used on a plurality of overhead electric lines, each having its own spacing requirements.

It is a further object and advantage of the present invention to provide an aerial cable spacer that is modular in nature with each piece being inexpensive and easy to manufacture and mass produce.

It is an additional object and advantage of the present invention to provide an aerial cable spacer having an improved mechanism for securely holding the cables in locked relation to the spacer device.

Other objects and advantages of the present invention will in part be obvious and in part appear hereinafter.

SUMMARY OF THE INVENTION

In accordance with the foregoing objects and advantages, the present invention is essentially comprised of three clamping blocks interconnected to one another by elongated rods, whereby an essentially triangular cable spacer device is formed. Each of the clamping blocks securely retains one cable in a steady position. By placing a plurality of cable spacer devices at spaced intervals along the length of the cables, the cables will be prevented from coming into contact with one another and thereby creating a fault in the electrical distribution system.

The cable clamping blocks come in one of two configurations: one having two rod receiving, bored holes formed therein and extending at about a 30 degree angle from one another, and the other having two rod receiving, bored holes formed therein and extending at about a 120 degree angle from one another. Both configurations of blocks include a cable clamping member that is pivotally and slidably attached thereto. Each block includes a recessed portion in which a clamping member sits, and a pair of spaced apart tongue portions each having a hole formed therethrough which receive a pivot pin.

The clamping members each include two forks extending in parallel, spaced relation to one another which define a U-shaped slot to receive a cable therein. An oval hole formed through the body of each clamping member receives a pivot pin therethrough in order to provide the attachment to the block. The clamping member's outer fork includes a flat portion formed on the block's recess.

After a cable is positioned between the forks, the clamping member is pivoted towards the recess and then slid downwardly to sit in the recess, thereby locking the cable within the clamp assembly. The corresponding flat portions on the clamping member and block cooperate to prohibit the clamping member from becoming disengaged from the recess without an external force sliding the clamping member upwardly away from the recess. A second hole is formed through the body of each clamping member. By placing a stick or rod through the second hole and lifting upwardly, the clamping member also will slide upwardly and become disengaged from the body's recess.

BRIEF DESCRIPTION OF THE DRAWINGS

FIG. 1 is a perspective view of a fully assembled cable spacer assembly;

FIG. 2 is an exploded, front elevational view of a 30 degree clamping assembly;

FIG. 3 is an exploded, front elevational view of a 120 degree clamping assembly.

DETAILED DESCRIPTION

Figure 4A:
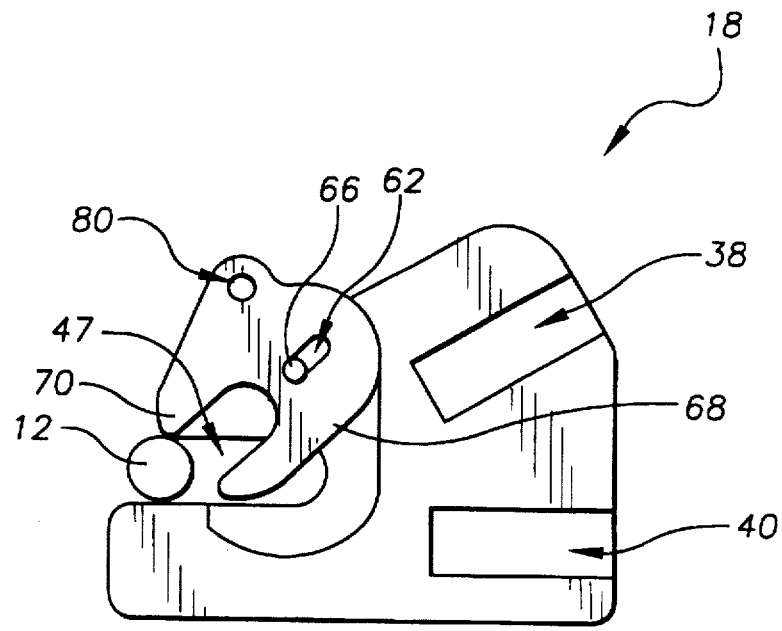
FIGS. 4a–4d are sequential, front elevational views illustrating the operation of the clamping assembly.

Referring now to the drawing figures, wherein like reference numerals refer to like parts throughout, there is seen in FIG. 1 a cable spacer device, denoted generally by reference numeral 10, securely maintaining three, over-head electric cables 12, 14 and 16 in spaced relation from one another. Device 10 is positioned on cables 12, 14 and 16 at an intermediate position between adjacent, cable supporting poles (not shown). Hence, device 10 prevents cables 12, 14 and 16 from coming into contact with one another and thereby causing a fault in the electric distribution system.

Each device 10 is essentially comprised of three cable clamp assemblies, denoted generally by reference numerals 18, 20 and 22, interconnected by elongated rods 24, 26 and 28. By placing device 10 at an intermediate position between adjacent poles, cable clamp assemblies 18, 20 and 22 will sufficiently retain cables 12, 14 and 16, respectively, to prevent them from coming into contact with one another. Depending on the spacing between successive poles, it may be necessary to position more than one device 10 between each set of successively positioned poles to ensure that cables 12, 14 and 16 won't come into contact with one another.

With particular reference to FIG. 2, cable clamp assembly 18 (or 22) is seen to be partly comprised of a body portion 30 having opposed, planar surfaces 32, 34 held in spaced relation to one another by an integral, contiguous sidewall 36. Two bored holes 38, 40, each adapted to snugly receive one of rods 24, 26 and 28 therein, are formed in sidewall 36 and extend along respective axes, X—X and Y—Y, respectively, which are disposed at an acute angle α preferably around 30°. Body portion 30 further includes a recessed portion 42 and fixed tongues 44 and 46 which extend in spaced, parallel relation to one another and which integrally extend from body 30 in vertically spaced relation to recessed portion 42. A U-shaped slot 47 is defined in the space between tongues 44, 46 and recessed portion 42.

Recessed portion 42 is defined by contiguous sidewall 36 and side edges 37. The area of sidewall 36 which defines recess 42 includes a leading edge 48 which drops directly downwardly before continuing along an arcuate bottom portion 50 and then terminating in an essentially vertically extending trailing edge 52. Tongues 44 and 46 include a straight bottom edge 54 and holes 56 and 58, respectively, formed therethrough.

Cable clamp assembly 18 (or 22) are further partly comprised of a clamp, denoted generally by reference numeral 60, that is pivotally and slidably attached to body portion 30 and positioned between forks 44 and 46. Clamp 60 includes an oval shaped hole 62 formed through its body portion 64, and a pivot pin (bolt) 66 which passes through holes 56, 58 and 62, thereby pivotally attaching clamp 60 to body portion 30. Due to the oval shape of hole 62, clamp 60 may also be slid along pin 66.

Clamp 60 further includes two forks 68 and 70 extending integrally outwardly from body portion 60. Forks 68 and 70 extend in spaced, parallel relation to one another, forming a U-shaped channel 72 in which any one of the cables 12, 14 and 16 will slidingly fit. Both forks 68 and 70 may be simultaneously positioned in contoured relation to recessed portion 42, and fork 70 includes a flat, vertically extending portion 74 on its outwardly facing surface which contours and abuts leading edge 42 when positioned within recessed portion 42.

With one exception, clamping assembly 20 is identical to clamping assemblies 18 and 22, and hence the corresponding parts will be marked with corresponding reference numerals. The only difference between clamping assembly 20 from the others is that clamping assembly 20 includes two, rod receiving, bored holes 76 and 78 which extend along linear axes A—A and B—B, respectively, which are disposed at an obtuse angle Θ, preferably about 120°. Accordingly, when rods 24, 26 and 28 join clamping assemblies 18, 20 and 22, device 10 takes the form of a 30°-30°-120° isocolese triangle. This shape is the most practical as it will fit most 3-phase electric systems.

Referring now to FIGS. 4a–4d, the sequential operation of clamping assemblies 18, 20 and 22 is shown. FIG. 4a shows the initial step in locking cable 12 in clamping assembly 18. Clamp member 60 is pivoted about bolt 66 to a position entirely disengaged from recessed portion 42 so as to open a passage for cable 12 to be slid into slot 47. In addition, as shown in FIG. 4a, bolt 66 is positioned at the bottom of oval opening 62 so as to maximize the space available for cable 12 to pass into slot 47.

Figure 4B:
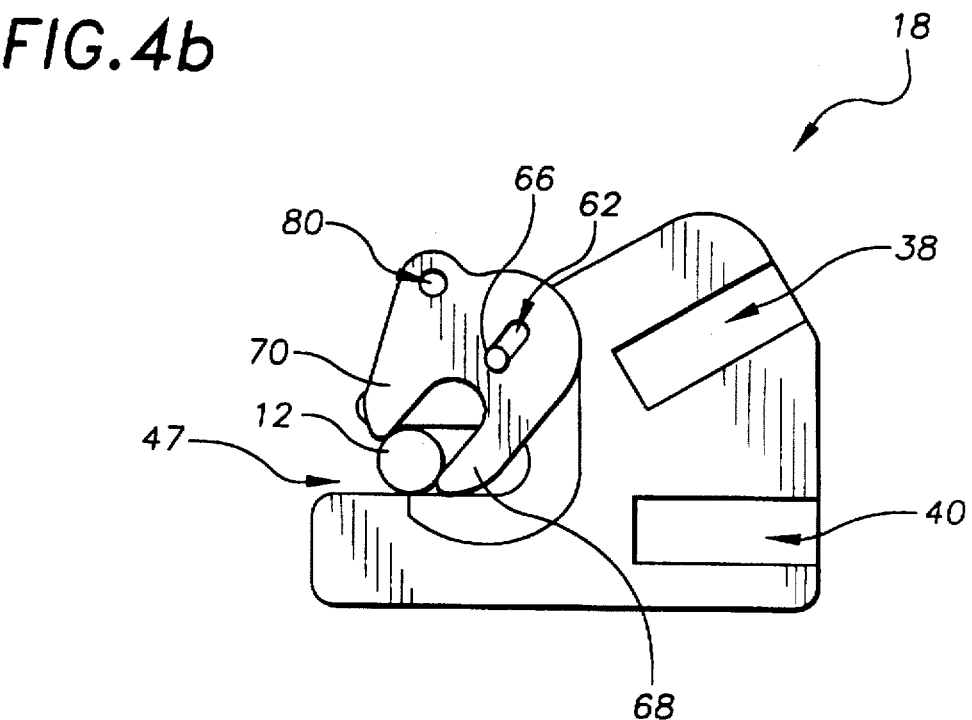

In FIG. 4b, cable 12 is seen to be sliding into slot 47 until it comes into contact with fork 68 of clamping member 60. At this point, bolt 66 is still positioned at the bottom of oval hole 62.

Figure 4C:
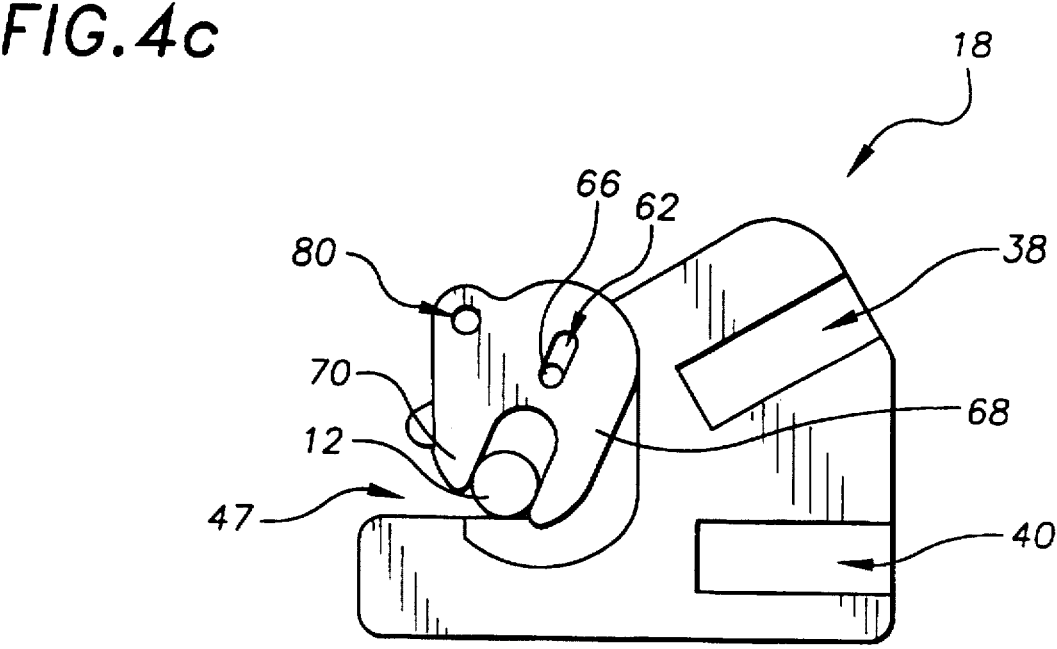

After cable 12 contacts fork 68, it is continually pushed into slot 47, thereby causing clamping member 60 to pivot towards body portion 20 (counter-clockwise as shown) about bolt 66, as is seen in FIG. 4c. Bolt 66 still remains positioned at the bottom of oval hole 62 so as to permit enough clearance between stem 70 and body portion 34.

Figure 4D:
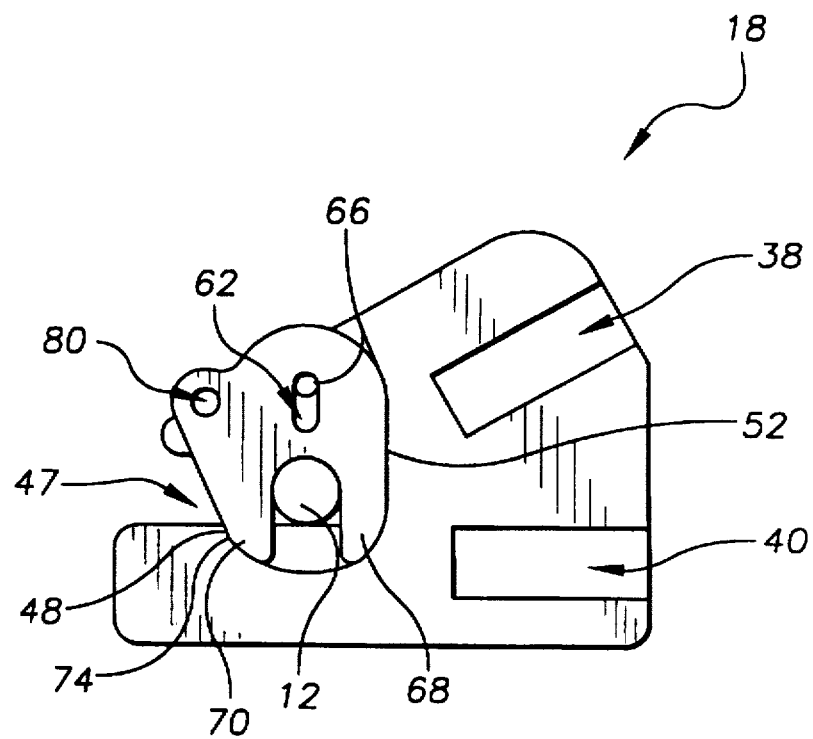
Figure 5:
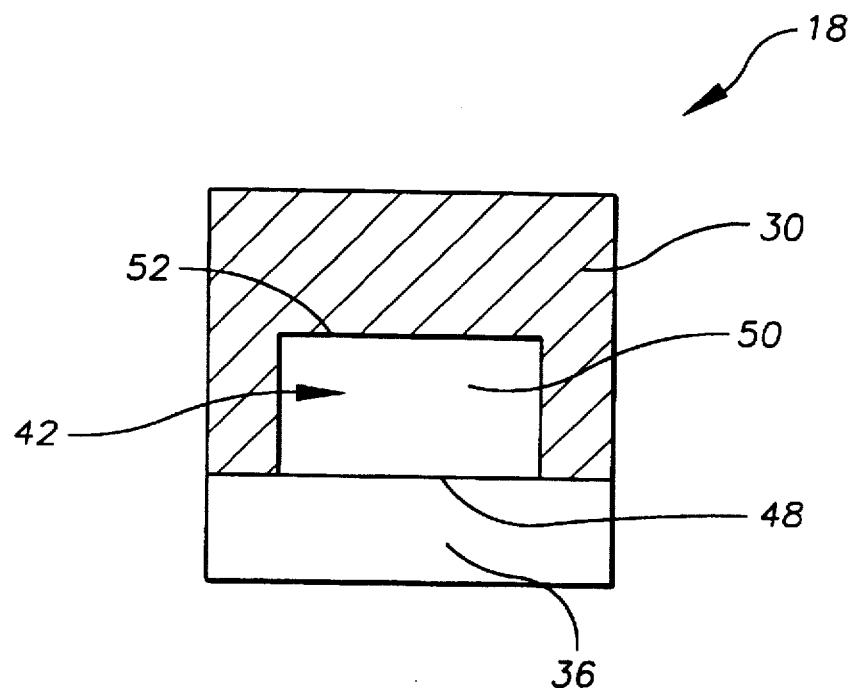
FIG. 5 is cross sectional view taken along line 5—5 of FIG. 2.
Figure 6:
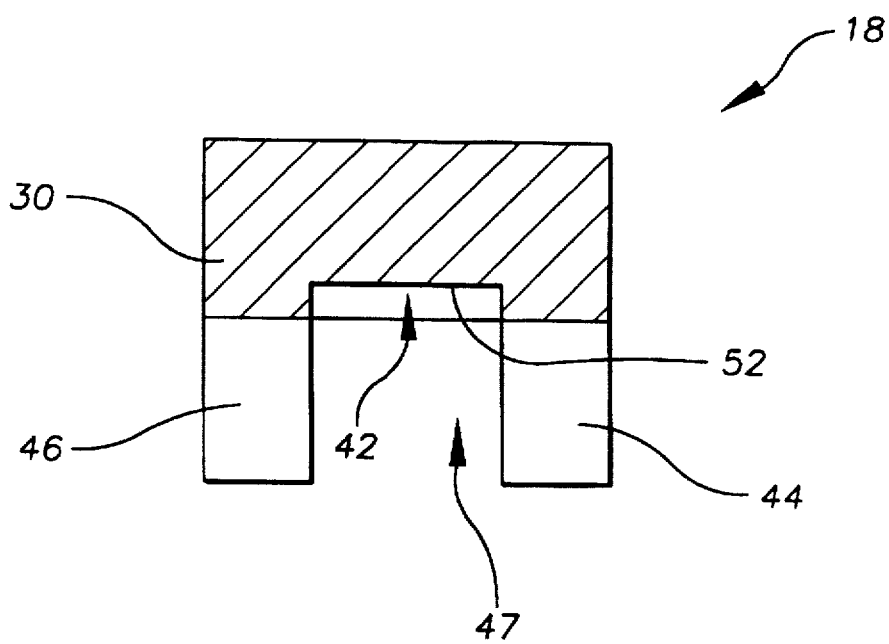
FIG. 6 is a cross sectional view taken along line 6—6 of FIG. 2.

FIGS. 4d illustrates the completion of the cable locking process. Cable 12 is positioned as far into slot 47 as it is able to go which results in clamp 60 being pivoted about bolt 66 until forks 68, 70 engage recessed portion 42 with fork 68 being positioned in contacting relation to trailing edge 52. In addition, clamp 60 slides downwardly as bolt 66 is repositioned at the top of oval cutout 62, thereby causing forks 68, 70 to fully engage recessed portion 42, and cable 12 to be positioned in confined relation between forks 68, 70 and edges 37. The flat, outer edge 74 of fork 70 is positioned in contoured relation to the downwardly extending leading edge 48 of recessed portion 42, thereby locking clamp 60 to body portion 34, and consequently retaining cable 12 with cable clamping assembly 18.

To disengage forks 68, 70 from recessed portion 42, each clamp 60 includes a hole 80 formed therethrough and positioned adjacent the outward edge of the member. A user of device 10 may insert a rod (not shown) or stick through hole 80 and pull upwardly, thereby causing bolt 66 to be slid downardly along oval hole 62 and forks 68, 70 to become disengaged from recessed portion 42. Clamping member 60 may then be pivoted away from body portion 30 (clockwise as shown) about bolt 66, thereby opening a passageway for cable 12 to be slid along edges 37 outwardly away from slot 47.

What is claimed is:

1. A device for maintaining overhead electric cables in spaced, non-contacting relation to one another, said device comprising:

a) first and second cable clamping assemblies each including:

i) a body member having first and second bored holes formed therein and a recessed portion, said first and second bored holes extending along first and second linear axes, respectively, which are disposed at a predetermined, acute angle from one another; and ii) a clamping member pivotally and slidably attached to said body member and having first and second forks extending in spaced, parallel relation to one another, said first and second forks being movable between engaged and disengaged relation with respect to said recessed portion;

b) a third cable clamping assembly including:

i) a body member having third and fourth bored holes formed therein and a recessed portion, said third and fourth bored holes extending along third and fourth linear axes, respectively, which are disposed at a predetermined obtuse angle with respect to one another; and ii) a clamping member pivotally and slidably attached to said body member and having third and fourth forks extending in spaced, parallel relation to one another, said third and fourth forks being movable between engaged and disengaged relation with respect to said recessed portion; and c) means for interconnecting said first, second and third cable clamping assemblies.

2. The device according to claim 1 wherein said means for interconnecting said first, second and third cable clamping assemblies includes first, second and third elongated rods having first and second ends, each of said first and second ends being removably positioned in one of said first, second, third and fourth bored holes.

3. The device according to claim 1 wherein said predetermined acute angle is about 30°.

4. The device according to claim 1 wherein said predetermined obtuse angle is about 120°.

* * * * *